E. W. LOUDEN.
AUTOMATIC BALANCING MEANS FOR HIGH SPEED ROTORS.
APPLICATION FILED AUG. 17, 1918.
1,314,005.
Patented Aug. 26, 1919.
3 SHEETS—SHEET 3.
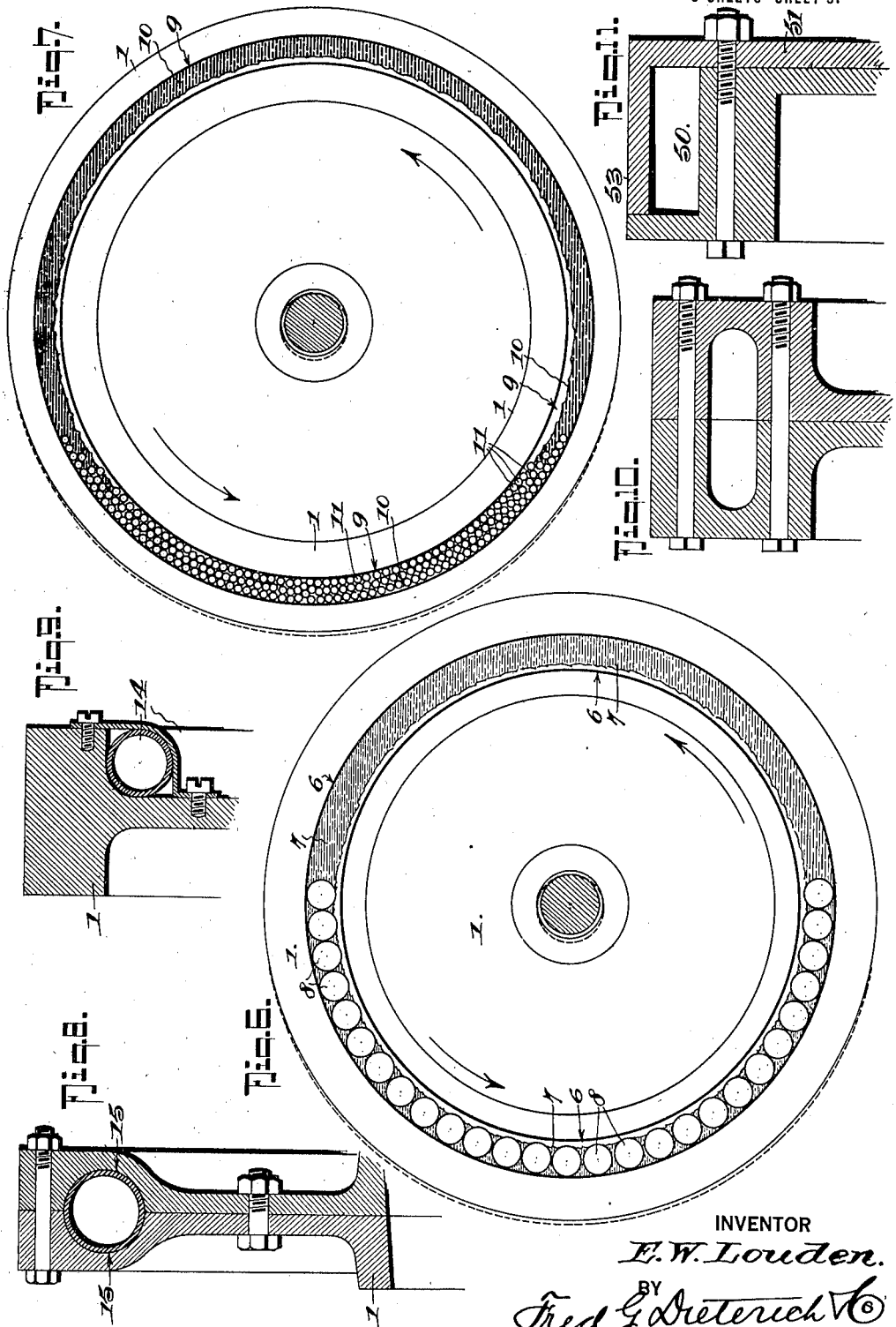
INVENTOR
E. W. Louden.
BY
Fred J. Dieterich & Co.
ATTORNEYS

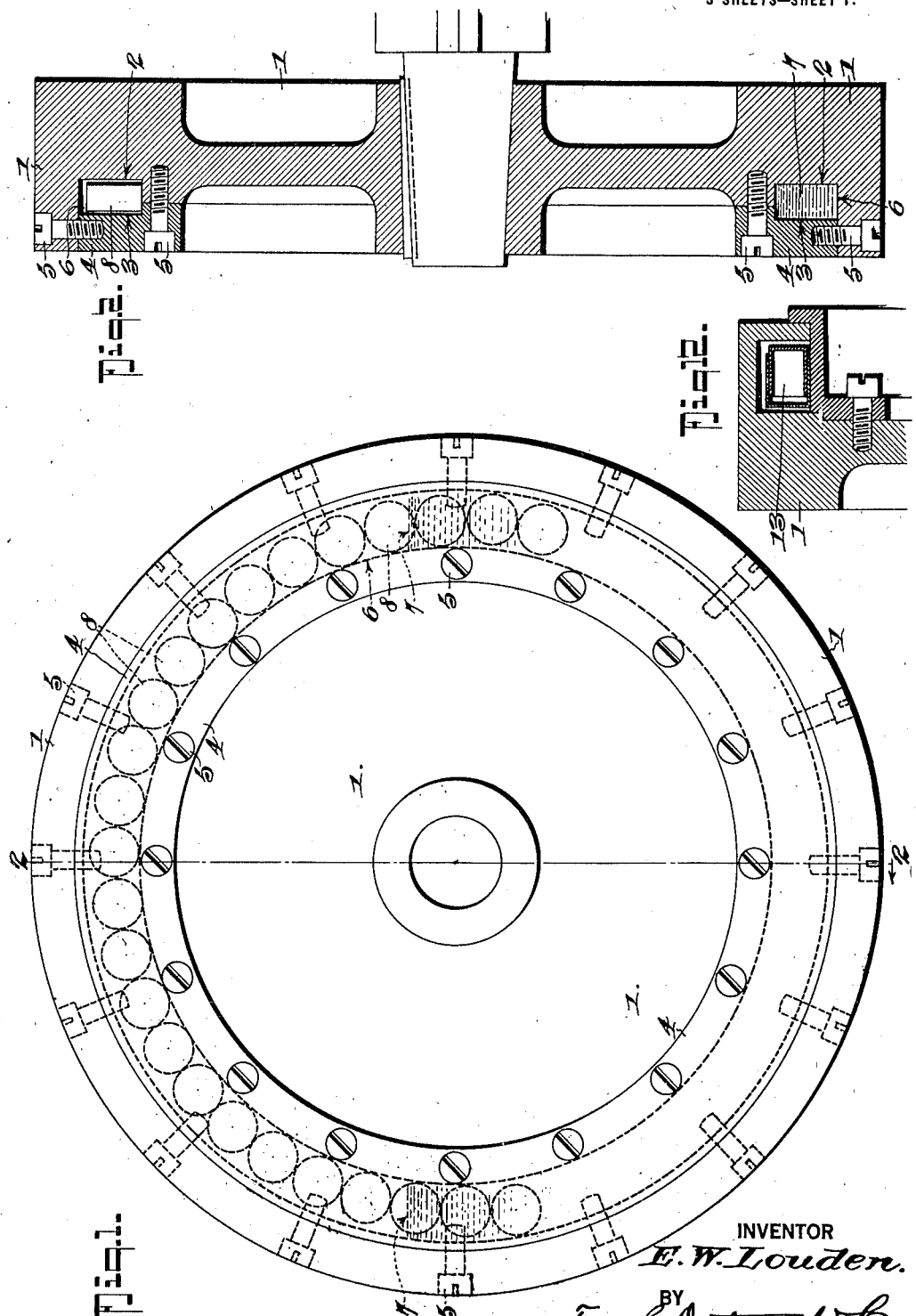

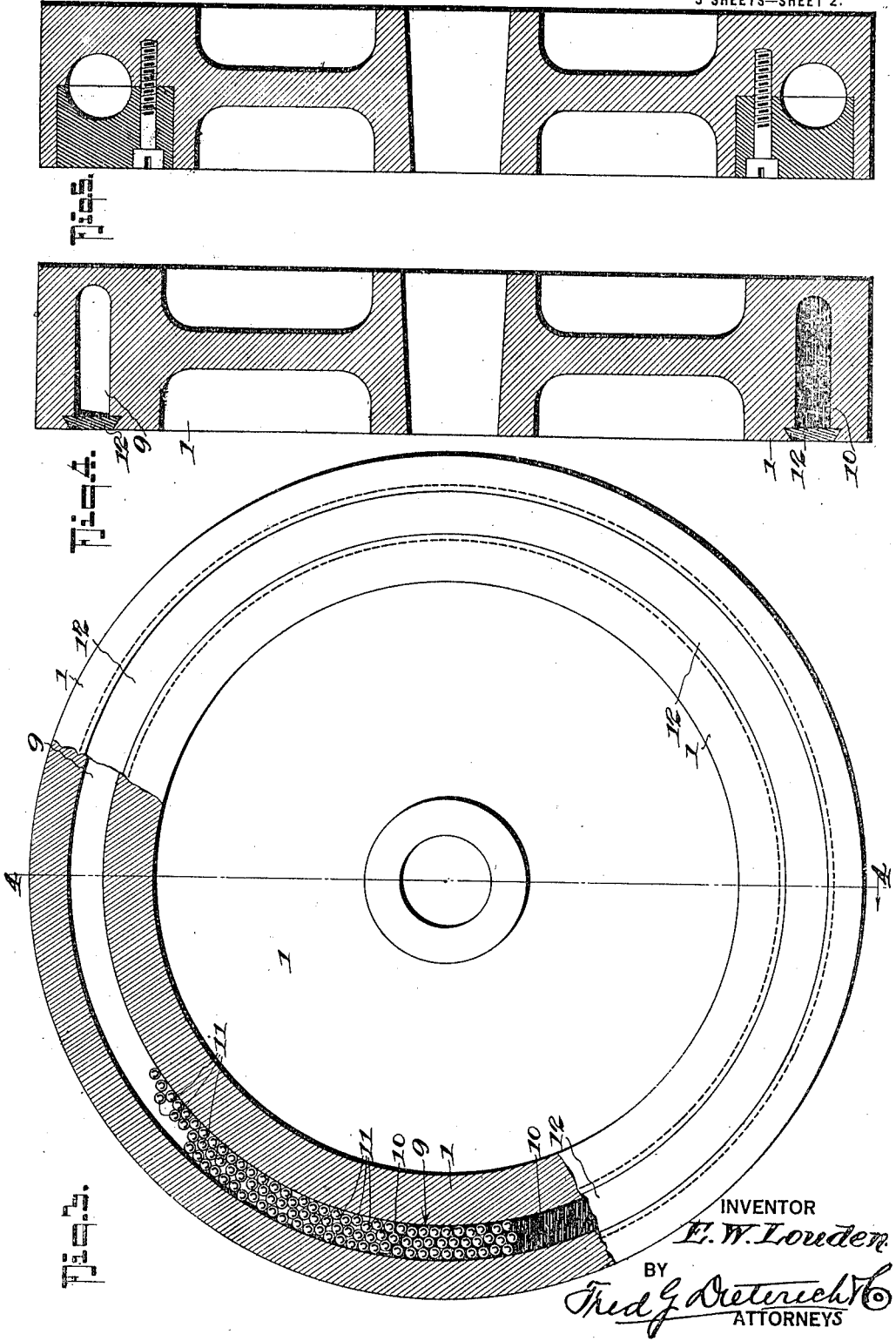

UNITED STATES PATENT OFFICE.

EDGAR WEIMER LOUDEN, OF PHILADELPHIA, PENNSYLVANIA.

AUTOMATIC BALANCING MEANS FOR HIGH-SPEED ROTORS.

1,314,005.        Specification of Letters Patent.        Patented Aug. 26, 1919.

Application filed August 17, 1918. Serial No. 250,368.

*To all whom it may concern:*

Be it known that I, EDGAR W. LOUDEN, a citizen of the United States, residing at Philadelphia, in the county of Philadelphia and State of Pennsylvania, have invented a new and Improved Automatic Balancing Means for High-Speed Rotors, of which the following is a specification.

This invention primarily has for its object to provide a means applicable to machines which have rapidly revolving parts, for example, high speed spindles on wood working machines, disk wheels, grindstones, motor armatures, gyroscopes, aeroplane propeller shafts and other high speed rotors, for eliminating vibration and noise in bearings and which automatically compensates, within predetermined limits, any irregularity in balance.

Another object of my invention is to provide an improved balancing means exceptionally valuable when applied to turbine rotors, steam or water, where the installation of new blades makes rebalancing necessary.

In its generic nature, my invention embodies a wheel or other axially mounted rotatable body, and a plurality of substances of different specific gravity arranged in annular relation upon or within the said rotatable body and adapted, under centrifugal action, to automatically shift with respect to the bearing of the rotatable body, and in such a manner that a perfect equilibrium of balance of the rapidly rotating body is constantly maintained.

In its more suborbinate features, my invention includes certain peculiar arrangements and novel combinations of parts, all of which will be hereinafter explained in detail, specifically pointed out in the appended claims and illustrated in the accompanying drawings, in which:

Figure 1 is a front elevation of a wheel that includes an embodiment of my invention, the balancing elements being shown at the normal or at rest position.

Fig. 2 is a vertical cross section thereof on the line 2—2 on Fig. 1.

Fig. 3 is a face view or part section of a wheel that embodies another or modified arrangement of my invention.

Fig. 4 is a detail cross section of the wheel structure shown in Fig. 3, taken on the line 4—4 on the said figure.

Fig. 5 is a cross section of a rotor in which is embodied another modification of my invention.

Fig. 6 is a diagrammatic face view of a wheel with my balancing means applied, the wheel being indicated as turning in the direction of the arrows, and the balancing substances indicated in position for maintaining the wheel in a true balance on the shaft, the pitch or eccentric position that the wheel would assume, were the balancing means omitted, being indicated in dotted lines.

Fig. 7 is a similar view of a wheel in which the balancing substances consist of mercury and lead balls.

Fig. 8 is a detail cross section of a modified arrangement of wheel rim and disk construction.

Fig. 9 is a detail cross section of a further modification hereinafter specifically referred to.

Figs. 10 and 11 illustrate other forms of rims and duct arrangements hereinafter mentioned.

Fig. 12 is a diagram that illustrates a disk shaped capsule float.

While the accompanying drawings illustrate different forms of rotor or wheel structures in which is included my improved means for effecting, automatically, a constant or perfect balance of the said wheel or rotor, and while the said structural arrangement of the parts disclose, in a simple manner, a practical application of my invention, it is to be understood that the said form of wheels or rotors are for illustrative purposes only and that my invention is not restricted to the specific construction of wheels or rotors shown and to be hereinafter fully described, since under the scope of the appended claims ample latitude for constructing the rotor, or other high speed rotatable body for receiving my automatic balancing means, as the character of the work for which the said high speed rotors may be provided and as conditions may make necessary.

Referring now more particularly to Figs. 1 and 2 of the drawings, which illustrate a simple example of a practical application of my balancing means, 1 designates a wheel, keyed or otherwise made fast on a shaft mounted in suitable bearings provided therefor. One face of the wheel is provided with an annular groove or recess 3 formed on the inner face of a combined closure and retainer held by lag bolts 5—5 that connect the rim 4, fluid tight, with the wheel rim, as is best shown in Fig. 2.

Within the annular duct 6, formed by the opposing annular grooves 2 and 3, is held a plurality of substances of different specific gravity, which may be a liquid (water) designated 7 and a series of floats which, in the construction shown in Figs. 1 and 2 may be hollow floats 8 of lesser specific gravity than the liquid and of a number to extend around the duct a distance less than the full length of the duct.

In the arrangement shown in Fig. 1, the water is shown as of a quantity to approximately fill one-half of the duct space and the floats as filling somewhat more than one-half of the duct space, the distance space or gap between the opposite ends of the filler floats and the opposite ends of the liquid filler, when the wheel or rotor is at rest, depending on the particular work for which the wheel or rotor is intended, it being understood that the amount of the duct filling, that is the floats and the water, may be more or less than that shown, but never sufficient for either to completely fill the said duct.

In the practical application of my invention, if liquid of one specific gravity is used with a solid of less specific gravity, say in proportion of 1000 to 750 and the quantity of the liquid is so governed that the solids (the floats) will come to rest against the float race at about the time they are submerged their maximum depth, under centrifugal force due to the rapid rotation of the wheel, the floats will move to the heavy side of the wheel and the liquid will be constantly and proportionately pushed or crowded up into the duct at the lighter side of the said wheel and thereby counterbalance the dislocated weight in the said wheel—the shifting of the two substances of different specific gravity will be best understood by reference to the diagrams, Figs. 6 and 7, which diagrammatically illustrate the changes in weight balance at the opposite sides of the wheel.

At this point it should be stated that the important feature in my invention is that, by reason of but partially filling the duct with substances of different specific gravities, as stated, the desired shifting of the said substances is effected and to make this clear, if there should be too great an amount of the heavy substance, liquid, in the wheel duct, the other substance of lighter weight, the floats, would not roll around and come into close contact with that surface of the duct having the largest radius when the wheel was rotating at a high speed, but would only remain in suspension in the liquid and hence the device would not function.

The gap between the two substances is necessary otherwise the wheel would derive no benefit.

It is understood that the effect of my automatic balancing means is practically *nil*, when the wheel journals in practically true balance, it is only when there is some clearance in the bearings (see Figs. 6 and 7, ample oil clearance is sufficient); or otherwise in the machine, that my balancing means comes into play.

It is obvious that when a wheel runs at a high speed in bearings that have plenty of clearance, the lack of a true wheel balance will either cause rocking or vibration in the machine, of which the wheel forms a part.

With my balancing means applied to such wheel, the solids (floats) would shift to the heaviest side of the wheel and the gap on the opposite side with the liquid at that side would add weight to the lighter side. This added weight would amount to the difference between the weight of the water in the gap and the weight of the water and floats directly opposite.

Another and essential feature of my invention is that if the balancing capacity of the two substances of different specific gravity were greater than the amount the wheel lacks to balance it, the gaps between each float in the group would be longer and the main gap between the end floats or balls of the group would be shorter in proportion.

As before stated, my invention is not confined to any specific construction of rotor or the manner in which the annular duct is formed with or attached to the rotor or wheel rim, nor is my invention to be restricted to providing two different shiftable substances with the duct, of water and floats, which may be balls or disks and which are normally held in suspension within the fluid, for example, instead of using water and balls or floats, as hereinbefore described, the two substitutes may be mercury and lead balls, and when the latter are used, the wheel structure is preferably made along the lines illustrated in Figs. 3 and 4, by reference to which it will be seen that the wheel rim has an annular groove or chamber 9 which opens through one face of the rim, as is best shown in Fig. 4, and in which the mercury 10 and the balls 11 are contained by a closure ring 12, secured to the wheel rim in any suitable manner.

Instead of employing balls in connection with the heavier substances, hollow metallic capsule disks 13 may be used, as shown in Fig. 12.

Instead of building the duct, in which the balancing substances are held, of two parts, a hollow ring 14 may be attached to a rotor, as illustrated in Fig. 9.

A further modification of the rotor construction is shown in Fig. 8 which illustrates, in cross section, a portion of a wheel rim made of two half sections whose meeting faces are provided with annular recesses 15.

While I have described but two balancing substances of different specific gravity, a like balancing effect is provided for by using more than two balancing substances, of two non-miscible liquids, water and oil, and in this form the floats may be hollow, it being understood that the said floats are of less specific gravity than the water.

The ducts may have almost any desired shape in cross section; for example, the duct may be of a substantially elongated shape in cross section, as shown in Fig. 2, which also illustrates a preferred manner of forming the duct on the rotor.

In the construction shown in Fig. 11, the duct is produced by forming the wheel rim with an external groove 50 that is covered by an inner closure ring 51 screwed fluid-tight over the groove 50 and which includes a flange 53 that closes over the said external groove 50.

It is understood that a suitably plugged tap is made in the rim in the construction just described for applying the fluid substance or substances for the duct.

From the foregoing taken in connection with the drawings it is believed the generic features of my invention and the manner in which my said invention may be practically developed and the advantages thereof will be readily apparent to those skilled in the art to which my said invention relates.

The use of my balancing means is not restricted to any specific type of wheel or rotor, since it may, without departing from my invention, as comes within the scope of the appended claims, be easily applied on rotors vertically or horizontally sustained about a centrifugal shaft.

What I claim is:

1. A rotor provided with an annular duct and a plurality of non-miscible substances within the said duct of different specific gravities, the lighter substance being suspended in the heavier substance.

2. A rotor provided with an annular duct and a plurality of substances within the said duct of different specific gravities, one of the said substances being a liquid and the other a solid floatable in the liquid.

3. A rotor provided with an annular duct and a plurality of substances within the said duct of different specific gravities, one of the said substances being a liquid and the other a solid floatable in the liquid, the said substances being insufficient to fill the duct when the rotor is at rest and adapted, under centrifugal force, to so shift within the duct whereby to sustain the rotor in a true balance about the axis upon which it rotates.

4. The combination with a body rotatable about a fixed axis; of means mounted upon the said body adapted for constantly maintaining the body in a true balance on the said fixed axis, the said means comprising an annular duct that constitutes a fixed part of the body and concentric with the shaft, and a plurality of substances contained within the duct, one of which is a liquid and the other is an insoluble solid or hollow float, the latter being held in suspension in the liquid and adapted under centrifugal force, when the body is rotated to constantly tend to shift the solids or hollow floats to the down-going or heavier side of the rotatable body and correspondingly shift the liquid to the up-going or lighter side of the body.

5. A body rotatably mounted on a fixed shaft, a duct annularly disposed about the shaft and carried by the said body, two substances of different specific gravities, the lighter substance being held in suspension in the heavier substance, under centrifugal force developed when the body rotates, to solidify on the down-going or heavier side of the body and force the displaced or lighter substance into the up-going or lighter side of the said body.

6. A wheel rotatable on a fixed shaft, an annular duct on the wheel, at least two substances of different specific gravities, the heavier of which is a liquid and the lighter a series of floats held in suspension in the liquid, the said floats being adapted as the wheel is rotated, to crowd together and displace the liquid on the down-going or heavier side of the wheel and force the displaced liquid into the lighter or up-going side of the wheel.

7. A wheel provided with an annular duct and a plurality of substances within the said duct of different specific gravities, the lighter substance being in suspension in the heavier substance when the wheel is at rest, the two substances filling the duct when the wheel is at rest.

8. A rotor adapted for being mounted on a fixedly held shaft, said rotor including an annular duct concentric with its axis and two substances of different specific gravities within the duct, one of the said substances being a liquid and the other a series of solid members floatable in the liquid and adapted, under the centrifugal force created by the movement of the rotor to so coact whereby to restore the lack of balance in the wheel relatively to its bearing or bearings.

EDGAR WEIMER LOUDEN.

Witness:
MICHAEL DISSINGER.